US005340422A

United States Patent [19]

Chang et al.

[11] Patent Number: 5,340,422

[45] Date of Patent: Aug. 23, 1994

[54] METHOD FOR MAKING FERRITE CHIP BEAD ARRAY

[75] Inventors: Dong S. Chang, Kyonggi-Do; Sang S. Lee, Seoul, both of Rep. of Korea

[73] Assignee: Boam R&D Co., Ltd., Rep. of Korea

[21] Appl. No.: 16,614

[22] Filed: Feb. 11, 1993

[51] Int. Cl.[5] .......... C03C 8/00

[52] U.S. Cl. .......... 156/89; 29/25.42

[58] Field of Search .......... 156/89, 272.2; 29/25.35, 25.03, 25.42, 601, 604, 609, 600, 592.1; 437/188

[56] References Cited

U.S. PATENT DOCUMENTS

| | | | |
|---|---|---|---|
| 2,134,752 | 11/1938 | Ehlers | 264/148 |
| 2,596,284 | 5/1952 | Peters | 264/174 |
| 2,780,837 | 2/1957 | Math | 156/89 |
| 2,844,693 | 10/1958 | Rigterink | 156/89 |
| 2,879,185 | 3/1959 | King | 156/89 |
| 3,097,929 | 7/1963 | Ragan | 264/148 |
| 3,187,403 | 6/1965 | Ohntrup | 437/188 |
| 3,235,939 | 2/1966 | Rodriguez | 156/89 |
| 3,300,843 | 1/1967 | Umewaka | 156/892 |
| 3,604,082 | 10/1968 | McBrayer | 156/89 |
| 3,689,336 | 9/1972 | Bunker | 156/89 |
| 3,821,053 | 6/1974 | Wilcox | 156/257 |
| 3,882,059 | 5/1975 | Elderbaum | 156/89 |
| 3,893,230 | 7/1975 | Stadler | 156/89 |
| 4,079,511 | 3/1978 | Grabbe | 29/627 |
| 4,246,625 | 1/1981 | Prakash | 29/25.42 |
| 4,322,698 | 3/1982 | Takahashi | 333/184 |
| 4,353,153 | 10/1982 | Prakash | 29/25.42 |
| 4,424,615 | 1/1984 | Wakino | 29/25.42 |
| 4,591,947 | 5/1986 | Bagley | 29/25.42 |
| 4,953,273 | 9/1990 | Insetta | 29/25.42 |
| 5,001,014 | 3/1991 | Charles | 428/472 |
| 5,101,319 | 3/1992 | Diffeyes | 29/25.42 |
| 5,134,246 | 7/1992 | Beppu | 174/52.4 |
| 5,144,527 | 9/1992 | Amano | 29/25.42 |
| 5,146,662 | 9/1992 | Fierkens | 29/25.03 |
| 5,203,936 | 4/1993 | Dolhert | 156/89 |

*Primary Examiner*—David A. Simmons

*Assistant Examiner*—Mark De Simone

*Attorney, Agent, or Firm*—Lieberman & Nowak

[57] ABSTRACT

A method for making a ferrite chip bead array in which a plurality of reinforcing outer electrodes are formed at the upper and lower surfaces of a ferrite substrate structure having a pair of substrate sheets and a plurality of uniformly spaced conductive leads interposed between the substrate sheets to enhance the bonding force between each electrode and each corresponding inner conductive lead, as well as the bonding force between each outer electrode and each corresponding inner conductive lead as well as the bonding force between each outer electrode and the ferrite substrate structure. The reinforcing outer electrodes eliminate a tendency for outer electrodes to short-circuit from the ferrite substrate upon placement of the chip bead array on a circuit board. The subject method simplifies manufacture and prevents short circuit, thereby enhancing reliability and productivity.

5 Claims, 3 Drawing Sheets

METHOD FOR MAKING FERRITE CHIP BEAD ARRAY

BACKGROUND OF THE INVENTION

The present invention relates to a ferrite chip bead array, and more particularly to a method for making a ferrite chip bead array having a structure capable of mounting on a surface of a circuit board.

Ferrite chip beads are well-known elements for removing undesirable electron waves by impedance based on the amount of the ferrite substrate- When current flows through the ferrite substrate, its frequency bank portion exhibiting a high reduced loss is absorbed in the ferrite substrate and discharged as a heat (according to the characteristic of ferrite substrate). Chip beads having such characteristics are embodied as elements mountable on a surface of a circuit board.

Referring to FIG. 3*a*, there is illustrated a conventional structure of chip beads. As shown in FIG. 3*a*, the chip bead has a double-layered sheet structure comprising a pair of ferrite sheets 1 constituting a ferrite substrate. Ferrite sheets 1 have facing inner surfaces printed with conductive paste (not shown). This sheet structure is cut to a desired size and then subjected to a baking. Thereafter, a plurality of outer electrodes 4' are attached to opposite side surfaces of the sheet structure to form the chip bead.

Unfortunately, such a chip bead structure requires a troublesome manufacturing processes because ferrite paste must be printed on each sheet. Moreover, inner conductors formed by printing conductive paste have a small area and a weak bonding force (due to structure). Moreover, there are problems with poor contact between inner conductors and outer electrodes and a tendency for outer electrodes to short-circuit from the ferrite substrate upon placement of the chip bead on a circuit board. Since inner conductors have a microstructure, they may be varied in electric characteristic, upon baking in the presence of a ferrite substrate.

These disadvantages prevent the above-mentioned chip bead structure from being used in electrical circuits requiring a high degree of reliability.

SUMMARY OF THE INVENTION

An object of the subject invention is to eliminate the above-mentioned disadvantages encountered in the prior art and to provide a method for making a ferrite chip bead array capable of simplifying the manufacture, preventing short circuit, and enhancing reliability and productivity.

This object may be accomplished by providing a method for making a chip bead array comprising the steps of: preparing upper and lower ferrite substrate sheets, pressing and bonding the ferrite substrate sheets so that a plurality of uniformly spaced conductive leads fixed to the support frame are interposed between the ferrite substrate sheets to extend traversely, forming a plurality of reinforcing outer electrodes arranged in spaced lines crossing the conductive leads at the upper and lower surfaces of the ferrite substrate structure, cutting the ferrite substrate structure along a central line of each reinforcing outer electrode line and in a direction crossing the leads to divide the ferrite substrate structure into a plurality of ferrite substrate modules each having opposite side surfaces at which opposite cut ends of each conductive lead are exposed to the exterior, and forming a plurality of outer electrodes at the opposite side surfaces of each ferrite substrate module so that each of the outer electrodes is in contact with the corresponding reinforcing outer electrodes as well as the corresponding cut end of the corresponding conductive lead.

DETAILED DESCRIPTION OF THE INVENTION

The subject invention will now be described in terms of its preferred embodiments. These preferred embodiments are set forth to aid in understanding the subject invention, however, they are not to be construed as limiting.

Figure 1:
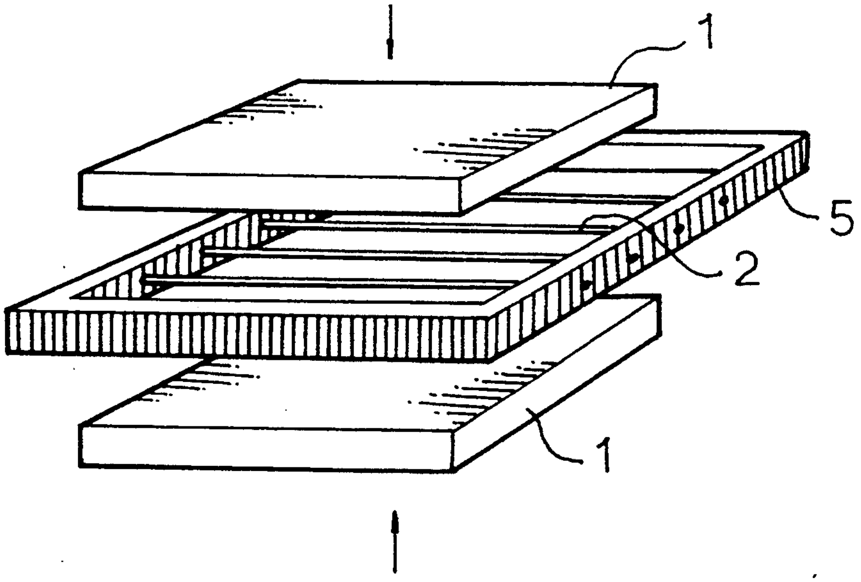
FIG. 1 is a perspective view illustrating the subject process for bonding two ferrite substrate sheets in a method for making a ferrite chip bead array.
Figure 2A:
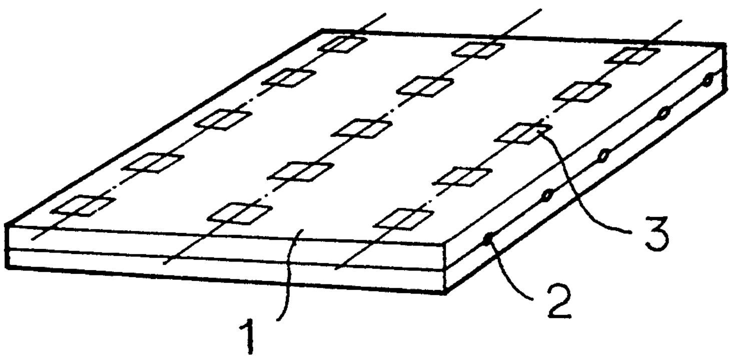
FIGS. 2*a* and 2*b* are perspective views illustrating the subject ferrite substrate structure on which a plurality of reinforcing outer electrodes are formed, and a ferrite substrate module formed by cutting the ferrite substrate structure, respectively.
Figure 2B:
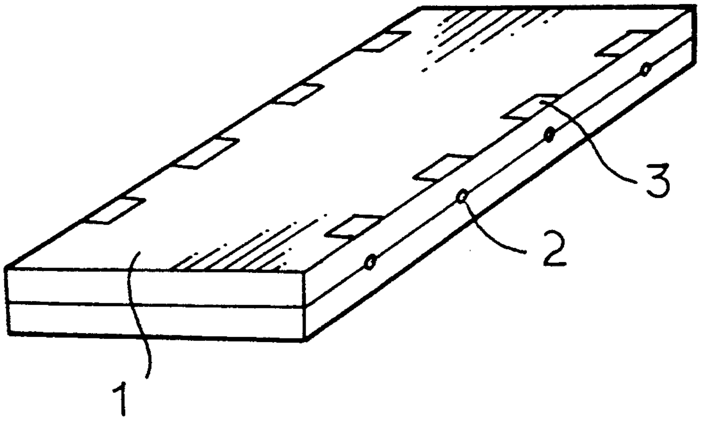
Figure 3A:
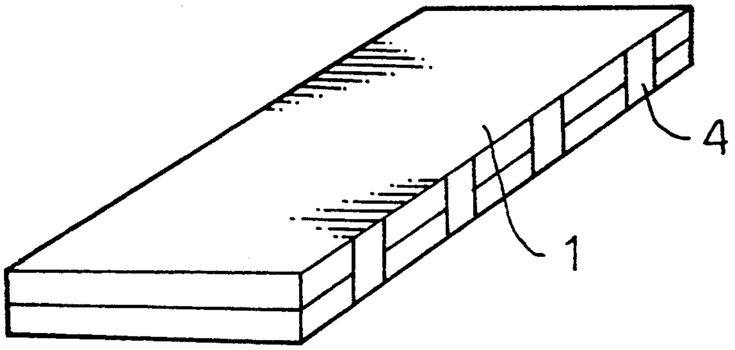
F I G.3a PRIOR ART
FIG. 3*a* is a perspective view of a prior art structure chip bead array.
Figure 3B:
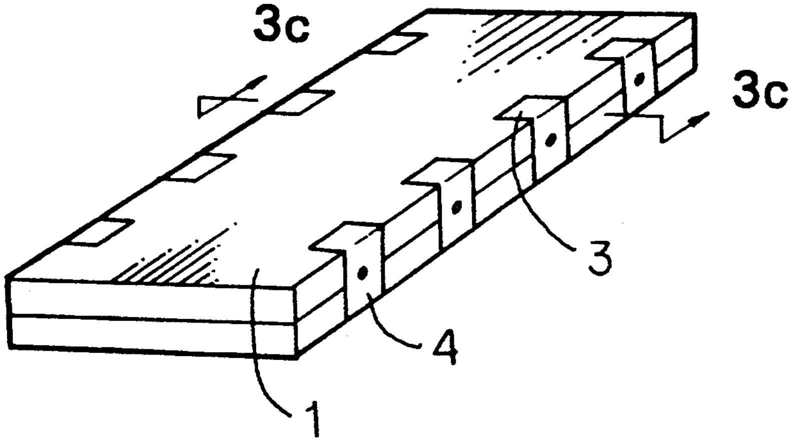
FIG. 3*b* is a perspective view of a structure of a chip bead array in accordance with the present invention.
Figure 3C:
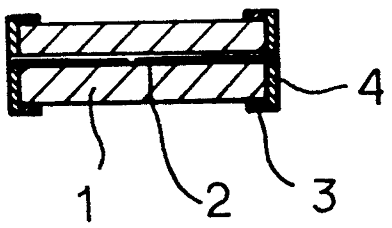
FIG. 3*c* is a cross-sectional view taken along the line A—A in FIG. 3*b*.

FIGS. 1, 2, **3*b* and 3*c* illustrate a method for making a ferrite chip bead array in accordance with the present invention. First, a pair of ferrite sheets 1 which will constitute a ferrite substrate are subjected to a pressing process under the conditions yielding a plurality of uniformly spaced conductive leads 2 interposed between ferrite sheets 1 (shown in FIG. 1) to form a double-layered ferrite substrate structure. In the ferrite substrate structure, opposite ends of each conductive lead 2 are exposed to the exterior at opposite side surfaces of the ferrite substrate structure. A plurality of uniformly spaced reinforcing outer electrodes 3 are then arranged in lines formed at the upper and lower surfaces of the ferrite substrate structure in such a manner that a paste is printed on the surfaces. The ferrite substrate structure is then subjected to a cutting process. Cutting is carried out along the central line of each reinforcing outer electrode line and in the direction crossing leads 2** (shown in FIG. 2*a*). Through the cutting process, the ferrite substrate structure is divided into a plurality of ferrite substrate modules (three ferrite substrate modules having been illustrated) each having a plurality of reinforcing outer electrodes 3 at its opposite side edges. At the opposite side surfaces of each ferrite substrate module, opposite ends of each conductive lead 2 are exposed to the exterior. Finally, a paste is printed on the opposite side surfaces of each ferrite substrate module to form a plurality of outer electrodes 4.

Preparation of ferrite sheets 1 constituting the ferrite substrate will now be described in detail.

First, a mixture is prepared which contains from about 85 weight % to about 96 weight % of ferrite powder of a $MO.Fe_2O_3$ based composition wherein M is selected from a group consisting of manganese, nickel, zinc, copper, magnesium, cobalt (Mn, Ni, Zn, Cu, Mg, Co), and mixtures thereof, and from about 4 weight % to about 15 weight % of a material selected from a group consisting of rubbers, organic high molecular weight compound-based bonding materials, plasticizers, defoaming agents, wetting agents and lubricants. The mixture is then subjected to a moistening process to yield a moisture content of from about 15 weight % to about 25 weight % liquid. Thereafter, the moistened mixture is aged and sufficiently mulled, to obtain a ferrite slurry.

Each ferrite sheet 1 is subjected at its one surface to a spraying process using a water containing from about 2 weight % to about 5 weight % of organic bonding material and defoaming agent, so that the organic bonding material on the surface of ferrite sheet is melted by the sprayed water. Thereafter, a pair of sheets 1 are bonded together by a pressing process at a temperature of from about 40° C. to about 60° C. and a pressure of from about 2 tons/cm$^2$ to about 5 tons/cm$^2$, to form a double-layered ferrite substrate structure. Pressing is carried out under the condition that a plurality of uniformly spaced transversely extending conductive leads 2 are interposed between the ferrite sheets 1. Conductive leads 2 have superior thermal properties and a diameter of not more than about 0.2 mm and are made of silver, palladium or silver-palladium (Ag, Pd or Ag-Pd) alloy. To maintain the conductive leads in position during pressing, support frame 5 is used to which opposite ends of each conductive lead 2 are fixed (shown in FIG. 1).

It is preferred that each conductive lead 2 does not have a smooth surface, but rather a knurled or grooved surface, so as to improve the bonding force between each conductive lead 2 and the ferrite substrate structure.

Thereafter, a plurality of reinforcing outer electrodes 3 are formed at upper and lower surfaces of the ferrite substrate structure and arranged in lines crossing conductive leads 2 (shown in FIG. *2a*). Formation of reinforcing outer electrodes 3 is achieved by printing an Ag-Pd alloy-based paste containing from about 5 weight % to about 10 weight % of ferrite powder on the surfaces of the ferrite substrate structure.

Although reinforcing outer electrodes 3 are not in direct contact with inner conductive leads 2, they are in indirect contact with the inner conductive leads 2, via outer electrodes 4 which will be subsequently formed and connected to the reinforcing outer electrodes 3. They serve to enhance the bonding force between each outer electrode 4 and each corresponding inner conductive lead 2, as well as the bonding force between each outer electrode 4 and the ferrite substrate structure 1.

The ferrite substrate structure is then subjected to a cutting process. Cutting is carried out along the central line (indicated by a dotted line) of each reinforcing outer electrode line and in a direction crossing leads 2 (shown in FIG. *2a*). By cutting the ferrite substrate structure is divided into a plurality of ferrite substrate modules each having a plurality of reinforcing outer electrodes 3 at its opposite side edges (shown in FIG. *2b*). At the opposite side surfaces of each ferrite substrate module, opposite ends of each conductive lead 2 are exposed to external so that they come into close contact with corresponding outer electrodes 4 which will be subsequently formed.

Subsequently, a paste preferably of Ag, Pd or Ag-Pd alloy is printed on the opposite side surfaces of each ferrite substrate module, to form a plurality of outer electrodes 4 each of which is in close contact with the corresponding reinforcing outer electrodes 4 and the corresponding end of each outer electrode 4 as well as the ferrite substrate structure (shown in FIG. *3b*). The paste for forming outer electrodes 4 contains a ferrite in an amount of from about 8 weight % to about 13 weight %. This ferrite content is less than that of the paste for forming reinforcing outer electrodes 3.

The ferrite substrate structure is then subjected to a baking process at a temperature of from about 1,000° C. to about 1,150° C. Thereafter, the ferrite substrate structure is treated in an atmosphere having an oxygen content of not more than about 0.02% at a temperature of not more than about 800° C., so as to prevent Pd contained in conductive leads 2 and outer electrodes 4 from oxidizing.

Finally, a metal such as Cu, Ni or Sn is plated on the outer electrodes 4 to enhance weldability, heat resistance and durability of the outer electrodes. Thus, a chip bead array is obtained.

The present invention provides a method for making a ferrite chip bead array wherein a plurality of reinforcing outer electrodes are formed at the upper and lower surfaces of a ferrite substrate structure comprising a pair of substrate sheets and a plurality of uniformly spaced conductive leads are interposed between the substrate sheets so that they serve to enhance the bonding force between each outer electrode and each corresponding inner conductive lead as well as the bonding force between each outer electrode and the ferrite substrate structure, eliminating a tendency for outer electrodes to short circuit from the ferrite substrate upon carrying the chip bead array on a circuit board. The method of the present invention is also capable of simplifying manufacture, preventing a short circuit, and enhancing reliability and productivity.

Although preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for making a chip bead array comprising the steps of:

a. preparing upper and lower ferrite substrate sheets;
b. pressing and bonding the ferrite substrate sheets under conditions such that a plurality of uniformly spaced conductive leads fixed to a support frame are interposed between the ferrite substrate sheets and extended transversely;
c. forming a plurality of reinforcing outer electrodes arranged in spaced lines crossing the conductive leads at the upper and lower surfaces of the ferrite substrate structure;
d. cutting the ferrite substrate structure along a central line of each reinforcing outer electrode line and in a direction crossing the leads to divide the ferrite substrate structure into a plurality of ferrite substrate modules each having opposite side surfaces at which opposite cut ends of each conductive lead are exposed to the exterior; and
e. forming a plurality of outer electrodes at the opposite side surfaces of each ferrite substrate module so that each of the outer electrodes is in contact with the corresponding reinforcing outer electrodes as well as the corresponding cut end of the corresponding conductive lead.

2. A method of claim 1, wherein the pressing and bonding are performed at a temperature of from about 40° C. to about 60° C.

3. A method of claim 1, wherein the pressing and bonding are at a pressure of from about 2 tons/$cm^2$ to about 5 tons/$cm^2$.

4. A method of claim 1 further comprising baking the ferrite substrate structure at a temperature from about 1,000° C. to about 1,150° C.

5. A method of claim 2 further comprising heating the baked ferrite substrate at a temperature of not more than about 800° C. in an atmosphere containing not more than about 0.2% oxygen.

* * * * *